United States Patent
Liu et al.

(10) Patent No.: US 11,582,622 B2
(45) Date of Patent: Feb. 14, 2023

(54) METHOD AND DEVICE FOR TIGHT INTERWORKING PROCESSING, AND BASE STATION

(71) Applicant: DATANG MOBILE COMMUNICATIONS EQUIPMENT CO., LTD., Beijing (CN)

(72) Inventors: Aijuan Liu, Beijing (CN); Jing Liang, Beijing (CN); Dajun Zhang, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 139 days.

(21) Appl. No.: 17/056,980

(22) PCT Filed: May 8, 2019

(86) PCT No.: PCT/CN2019/086016
§ 371 (c)(1),
(2) Date: Nov. 19, 2020

(87) PCT Pub. No.: WO2019/223537
PCT Pub. Date: Nov. 28, 2019

(65) Prior Publication Data
US 2021/0211898 A1    Jul. 8, 2021

(30) Foreign Application Priority Data
May 21, 2018  (CN) .......................... 201810490765.6

(51) Int. Cl.
*H04W 24/02* (2009.01)
*H04W 92/20* (2009.01)

(52) U.S. Cl.
CPC ............ *H04W 24/02* (2013.01); *H04W 92/20* (2013.01)

(58) Field of Classification Search
CPC ..... H04W 24/02; H04W 92/20; H04W 24/10; H04W 8/14; H04W 36/0069; H04W 36/0085; H04W 76/16
See application file for complete search history.

(56) References Cited

U.S. PATENT DOCUMENTS

2013/0165123 A1   6/2013  Takahashi
2017/0367018 A1  12/2017  Huang et al.
(Continued)

FOREIGN PATENT DOCUMENTS

CN   107006055 A   8/2017
CN   107409316 A   11/2017

OTHER PUBLICATIONS

Chinese Office Action dated Apr. 3, 2020 for CN Application No. 201810490765.6.
(Continued)

*Primary Examiner* — Chuong A Ngo
(74) *Attorney, Agent, or Firm* — Harness, Dickey & Pierce, P.L.C.

(57) ABSTRACT

A method and a device for tight interworking processing, and a base station are provided, which relate to the technical field of communications. The method for tight interworking processing, applied to a first base station, includes: transmitting association information between a first cell and a second cell to a second base station; where the first cell is a cell belonging to the first base station, and the second cell is a cell requested by the first base station and belonging to the second base station.

20 Claims, 4 Drawing Sheets

Transmit, based on a measurement report received from a user equipment, an SgNB addition request message to the second base station, where the SgNB addition request message carries an identity of a serving cell of the user equipment under the first base station and a PCI of a target SCG cell ⟶ 201

Receive an SgNB addition response message returned by the second base station, where the SgNB addition response message carries an identity of a third cell found by the first base station based on the identity of the serving cell and the PCI of the target SCG cell ⟶ 202

Perform tight interworking configuration for the user equipment based on the identity of the third cell ⟶ 203

(56) References Cited

U.S. PATENT DOCUMENTS

| | | | |
|---|---|---|---|
| 2018/0014229 A1 | 1/2018 | Chiba et al. | |
| 2018/0042060 A1 | 2/2018 | Neubacher et al. | |
| 2019/0037417 A1* | 1/2019 | Lei | H04W 72/085 |
| 2019/0037450 A1* | 1/2019 | Chang | H04W 36/0072 |
| 2020/0396656 A1* | 12/2020 | Yang | H04W 36/0058 |

OTHER PUBLICATIONS

Written Opinion and International Search Report for International Application No. PCT/CN2019/086016 dated Nov. 24, 2020.

Huawei, "Stage 3 CR of X2 setup and node configuration update for option 3", 3GPP TSG RAN WG3 Meeting #97bis, R3-174112, Prague, Czech Republic, Oct. 9-13, 2017, Change Request, 36.423, CR—rev—Current version 14.4.0.

Nokia, Nokia Shanghai Bell, "EN-DC ANR and RAN sharing related updates for X2 setup state 3", 3GPP TSG-RAN WG3 Meeting #98, R3-174951, Reno, Nevada, Nov. 27-Dec. 1, 2017.

Huawei, "Xn setup and NG-RAN node configuration update", 3GPP TSG-RAN3 Meeting #99bis, R3-182364, Sanya, China, Apr. 16-20, 2018.

Extended European Search Report dated Jun. 1, 2021 for EP Application No. 19 80 6468.

Samsung, "Additional information in CG-Configinfo to resolve PCID confusion", Agenda Item 10.4.1.9.1, 3GPP TSG-RAN WG2 Meeting #101bis, R2-1806119 (Revision of R2-1803418), Sanya, China, Apr. 16-20, 2018.

CATT, "Discussion on selection of SCG cells for EN-DC scenario", Agenda Item 31.3.1.4, 3GPP TSG-RAN WG3#100, R3-182835, Busan, Korea, May 21-25, 2018.

Samsung, "Discussion for PCI Confusion", Agenda Item 31,3.1.4, 3GPP TSG-RAN WG3#100, R3-183026 Busan, South Korea, May 21-25, 2018.

Samsung, "Addition of MeNB cell ID to solve the PCI confusion", Change Request, 36.423, CR 1161 Current version 15.1.0, 3GPP TSG-RAN WG3#100, R3-183027, Busan, South Korea, May 21-25, 2018.

* cited by examiner

Receive association information between a first cell and a second cell, where the association information is transmitted by a first base station, the first cell is a cell belonging to the first base station, and the second cell is a cell requested by the first base station and belonging to the second base station — 501

Transmitting module — 610

METHOD AND DEVICE FOR TIGHT INTERWORKING PROCESSING, AND BASE STATION

CROSS-REFERENCE TO RELATED APPLICATIONS

This application is the U.S. national phase of PCT Application No. PCT/CN2019/086016 filed on May 8, 2019, which claims a priority to Chinese Patent Application No. 201810490765.6 filed on May 21, 2018, the disclosures of which are incorporated in their entirety by reference herein.

TECHNICAL FIELD

The present disclosure relates to the technical field of communications, and in particular to a method and a device for tight interworking processing, and a base station.

BACKGROUND

In a long term evolution (LTE) system, an evolved UMTS terrestrial radio access network (E-UTRAN) is formed by multiple eNBs (4G base stations). The eNB and a packet core network EPC are connected through an S1 interface, and the eNBs are connected through an X2 interface. In order to support higher data throughput, a user equipment (UE) may implement dual connectivity through two eNB s.

In a 5G system, similar to the dual connectivity of the LTE system, tight interworking between an eNB and a gNB (5G base station) is supported. The 5G base station may be deployed at high frequencies, coverage of a cell is relatively small, and the quantity of physical layer cell identities (PCI) of cells is limited; in view of the above, within the coverage of the eNB, the same PCI may be allocated to multiple new radio (NR) cells, which results in PCT conflict.

Therefore, the gNB cannot determine the relationship between some NR cells requested by the eNB and cells of the eNB, which then affects the accuracy of determining a target secondary cell group (SCG) cell for the UE.

SUMMARY

The present disclosure is to provide a method and a device for tight interworking processing, and a base station, to address the issue that in the tight interworking scenario the gNB cannot determine neighbours of which cells under the eNB the part of NR cells requested by the eNB respectively belong to, which solves the problem of how to accurately determine the target SCG cell for the UE.

To achieve the above object, embodiments of the present disclosure provide a method for tight interworking processing, applied to a first base station, which includes:

transmitting, to a second base station, association information between a first cell and a second cell;

where the first cell is a cell belonging to the first base station, and the second cell is a cell requested by the first base station and belonging to the second base station.

The step of the transmitting to the second base station the association information between the first cell and the second cell includes:

transmitting, to the second base station, an EUTRA-NR dual connectivity (EN-DC) configuration update message carrying the association information; or, transmitting, to the second base station, a next generation radio access network (NG RAN) node configuration update message carrying the association information.

The association information between the first cell and the second cell includes: a correspondence between the first cell and the second cell requested by the first cell.

The association information between the first cell and the second cell includes: a correspondence between the second cell and all first cells requesting the second cell.

The method further includes:

transmitting, based on a measurement report received from a user equipment, a secondary gNB (SgNB) addition request message to the second base station, where the SgNB addition request message carries an identity of a serving cell of the user equipment under the first base station and a physical layer cell identity (PCI) of a target secondary cell group (SCG) cell;

receiving an SgNB addition response message returned by the second base station, where the SgNB addition response message carries an identity of a third cell found by the first base station based on the identity of the serving cell and the PCI of the target SCG cell; and performing tight interworking configuration for the user equipment based on the identity of the third cell.

The association information between the first cell and the second cell includes an identity of the first cell, and the identity of the first cell includes:

an evolved universal mobile telecommunications system terrestrial radio access network cell global identifier (ECGI); or, a PCI and a frequency.

The association information between the first cell and the second cell includes an identity of the second cell, and the identity of the second cell includes: a new radio cell global identifier (NR-CGI).

To achieve the above object, embodiments of the present disclosure provide a method for tight interworking processing, applied to a second base station, which includes:

receiving association information between a first cell and a second cell, where the association information is transmitted by a first base station;

where the first cell is a cell belonging to the first base station, and the second cell is a cell requested by the first base station and belonging to the second base station.

The step of the receiving the association information between the first cell and the second cell, the association information being transmitted by the first base station, includes:

receiving an EN-DC configuration update message carrying the association information, or, receiving an NG RAN node configuration update message carrying the association information.

The association information between the first cell and the second cell includes an identity of the first cell and an identity of the second cell.

The method further includes:

receiving an SgNB addition request message transmitted by the first base station, where the SgNB addition request message carries an identity of a serving cell of a user equipment under the first base station and a PCI of a target SCG cell;

querying based on the identity of the serving cell, the PCI of the target SCG cell, and the association information between the first cell and the second cell, to obtain an identity of a third cell corresponding to the serving cell; and transmitting, to the first base station, an SgNB addition response message carrying the identity of the third cell.

To achieve the above object, embodiments of the present disclosure provide a device for tight interworking processing, applied to a first base station, which includes:

a transmitting module, configured to transmit, to a second base station, association information between a first cell and a second cell;

where the first cell is a cell belonging to a first base station, and the second cell is a cell requested by the first base station and belonging to the second base station.

To achieve the above object, embodiments of the present disclosure provide a device for tight interworking processing, applied to a second base station, which includes:

a receiving module, configured to receive association information between a first cell and a second cell, where the association information is transmitted by a first base station;

where the first cell is a cell belonging to the first base station, and the second cell is a cell requested by the first base station and belonging to the second base station.

To achieve the above object, embodiments of the present disclosure provide a base station. The base station is a first base station and includes: a transceiver, a memory, a processor, and a computer program stored in the memory and executable by the processor;

the transceiver is configured to transmit, to a second base station, association information between a first cell and a second cell;

the first cell is a cell belonging to the first base station, and the second cell is a cell requested by the first base station and belonging to the second base station.

The transceiver is further configured to:

transmit, to the second base station, a EN-DC configuration update message carrying the association information; or, transmit, to the second base station, an NG RAN node configuration update message carrying the association information.

The association information between the first cell and the second cell includes: a correspondence between the first cell and the second cell requested by the first cell.

The association information between the first cell and the second cell includes: a correspondence between the second cell and all first cells requesting the second cell.

The transceiver is further configured to: transmit, based on a measurement report received from a user equipment, an SgNB addition request message to the second base station, where the SgNB addition request message carries an identity of a serving cell of the user equipment under the first base station and a physical layer cell identity (PCI) of a target secondary cell group (SCG) cell; and receive an SgNB addition response message returned by the second base station, where the SgNB addition response message carries an identity of a third cell found by the first base station based on the identity of the serving cell and the PCI of the target SCG cell; and the processor is configured to perform tight interworking configuration for the user equipment based on the identity of the third cell.

The association information between the first cell and the second cell includes an identity of the first cell, and the identity of the first cell includes:

an evolved universal mobile telecommunications system terrestrial radio access network cell global identifier (ECGI); or, a PCI and a frequency.

The association information between the first cell and the second cell includes an identity of the second cell, and the identity of the second cell includes: a new radio cell global identifier (NR-CGI).

To achieve the above object, embodiments of the present disclosure provide a base station. The base station is a second base station and includes: a transceiver, a memory, a processor, and a computer program stored in the memory and executable by the processor;

the transceiver is configured to receive association information between a first cell and a second cell, where the association information is transmitted by a first base station, the first cell is a cell belonging to the first base station, and the second cell is a cell requested by the first base station and belonging to the second base station.

The transceiver is further configured to:

receive an EN-DC configuration update message carrying the association information; or receive an NG RAN node configuration update message carrying the association information.

The association information between the first cell and the second cell includes an identity of the first cell and an identity of the second cell.

The transceiver is further configured to receive an SgNB addition request message transmitted by the first base station, where the SgNB addition request message carries an identity of a serving cell of a user equipment under the first base station and a PCI of a target SCG cell;

the processor is configured to query based on the identity of the serving cell, the PCI of the target SCG cell, and the association information between the first cell and the second cell, to obtain an identity of a third cell corresponding to the serving cell; and the transceiver is further configured to transmit, to the first base station, an SgNB addition response message carrying the identity of the third cell.

To achieve the above object, embodiments of the present disclosure provide a computer readable storage medium, having a computer program stored thereon. The computer program, when being executed by a processor, performs the steps of the above method for tight interworking processing applied to the first base station.

To achieve the above object, embodiments of the present disclosure provide a computer readable storage medium, having a computer program stored thereon. The computer program, when being executed by a processor, performs the steps of the above method for tight interworking processing applied to the second base station.

The beneficial effects of the above technical solutions of the present disclosure are as follows.

In the method for tight interworking processing according to the embodiments of the present disclosure, the first cell is a cell belonging to the first base station, and the second cell is a cell requested by the first base station and belonging to the second base station. In this way, through transmitting the association information between the first cell and the second cell by the first base station to the second base station, the second base station can clearly understand cell-level association of the two base stations, which improves the accuracy of determining the target SCG cell for the UE in the subsequent.

BRIEF DESCRIPTION OF THE DRAWINGS

To better clarify technical solutions of embodiments of the present disclosure, drawings used in description of the embodiments are briefly introduced hereinafter. Apparently, the described drawings merely illustrate a part of the disclosed embodiments. A person ordinary skilled in the art can obtain other drawings based on the described drawings without any creative efforts.

DETAILED DESCRIPTION

In order to facilitate understanding of technical problems to be solved, technical solutions and advantages of the present disclosure, detailed descriptions are provided hereinafter with reference to the accompanying drawings and specific embodiments.

To address the problem in the related technologies that in the tight interworking scenario the gNB cannot determine the relation between some NR cells requested by the eNB and cells of the eNB and then accuracy of determining the target SCG cell for the UE is reduced, the present disclosure provides a method for tight interworking processing, to inform the gNB of a specific neighbour relation between some NR cells requested by the eNB and cells of the eNB, which solves the problem of how to accurately determine the target SCG cell for the UE.

Figure 1:
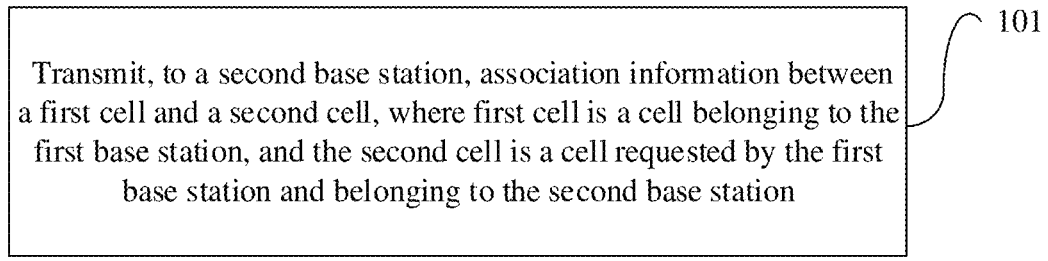
FIG. 1 is a first flow chart of steps of a method for tight interworking processing according to embodiments of the disclosure.

As shown in FIG. 1, a method for tight interworking processing according to embodiments of the present disclosure, which is applied to a first base station, includes the following step.

Step 101 includes: transmitting, to a second base station, association information between a first cell and a second cell.

The first cell is a cell belonging to the first base station, and the second cell is a cell requested by the first base station and belonging to the second base station.

The method of the embodiments of the present disclosure is applicable to a tight interworking scenario, where the first cell is a cell belonging to the first base station, and the second cell is a cell requested by the first base station and belonging to the second base station. In this way, through transmitting the association information between the first cell and the second cell by the first base station to the second base station, the second base station can clearly understand cell-level association of the two base stations, which improves the accuracy of determining the target SCG cell for the UE in the subsequent.

The first base station and the second base station are base stations of different systems. Optionally, the first base station is an eNB, and the second base station is a gNB.

It should be known that in the embodiments, considering that performing tight interworking for the UE requires establishing an X2/Xn interface between the eNB and the gNB, optionally, step 101 includes:

transmitting, to the second base station, a 4G-5G dual connectivity configuration update (EUTRA-NR dual connectivity configuration update, EN-DC configuration update) message carrying the association information; or, transmitting, to the second base station, a 5G access network node configuration update (next generation radio access network node configuration update, NG RAN node configuration update) message carrying the association information.

For the process of establishment of the X2 interface between the eNB and the gNB, the EN-DC configuration update message transmitted by the eNB to the gNB carries the association information between the first cell and the second cell, and the association information between the first cell and the second cell is notified to the gNB; for the process of establishment of the Xn interface between the eNB and the gNB, the NG RAN node configuration update message transmitted by the eNB to the gNB carries the association information between the first cell and the second cell, and the association information between the first cell and the second cell is notified to the gNB.

In the embodiments of the present disclosure, optionally, on the one hand, the association information between the first cell and the second cell includes: a correspondence between the first cell and the second cell requested by the first cell.

The association information between the first cell and the second cell is for cells under the first base station. The correspondence between the first cell and the second cell requested by the first cell is described.

It is assumed that cells of the eNB include Cell 1, Cell 2, and Cell 3, some neighbours of the gNB requested by the eNB include Cell A, Cell B, Cell C, and Cell D, the second cells requested by Cell 1 are Cell A and Cell B, the second cell requested by Cell 2 is Cell C, and the second cell requested by Cell 3 is Cell D. In this case, the association information between the first cells and the second cells may be recorded as Cell 1-(Cell A and Cell B), Cell 2-Cell C, Cell 3-Cell D.

Specifically, for this form of association information, an LTE cell list may be added under a limited list IE of Cell Assistance Information, as shown in Table 1 below.

TABLE 1

| IE/Group Name | Presence | Range | IE Type and Reference | Semantics Description |
|---|---|---|---|---|
| CHOICE Cell Assistance Type | M | | | This IE may be refined. |
| >Limited List | | | | |
| >> LTE Cell List | | | | |
| >>>ECGI or (PCI + Frequency) | | | | |
| >>>List of Requested NR Cells | | 1 .. < maxCell inengNB ( ) > | | Included when the eNB requests a limited list of served NR cells. |

TABLE 1-continued

| IE/Group Name | Presence | Range | IE Type and Reference | Semantics Description |
|---|---|---|---|---|
| >>>>NR-CGI | M | | 9.2.111 | NR cell for which served NR cell information is requested. (Identities of NR cells are requested) |
| >Full List | | | | |
| >>Complete Information Request Indicator | M | | ENUMERATED (allServed NRCells, . . . ) | Included when the eNB requests the complete list of served NR cells. |

On the other hand, the association information between the first cell and the second cell includes: a correspondence between the second cell and all first cells requesting the second cell.

The association information between the first cell and the second cell is for cells of the second base station requested by the first base station. The correspondence between the second cell and all first cells requesting the second cell is described.

Similarly, it is assumed that cells of the eNB include Cell 1, Cell 2, and Cell 3, some neighbours of the gNB requested by the eNB include Cell A, Cell B, Cell C, and Cell D, the second cells requested by Cell 1 are Cell A and Cell B, the second cell requested by Cell 2 is Cell C, and the second cell requested by Cell 3 is Cell D. In this case, the association information between the first cells and the second cells may be recorded as Cell A-Cell 1, Cell B-Cell 1, Cell C-Cell 2, Cell D-Cell 3.

Specifically, for the association information in the above form, an LTE cell identity corresponding to each NR cell may be added in the List of Requested NR Cells IE of Cell Assistance Information, as shown in Table 2 below.

TABLE 2

| IE/Group Name | Presence | Range | IE Type and Reference | Semantics Description |
|---|---|---|---|---|
| CHOICE Cell Assistance Type | M | | | This IE may be refined. |
| >Limited List | | | | |
| >>List of Requested NR Cells | | 1 .. < maxCellin engNB > | | Included when the eNB requests a limited list of served NR cells. |
| >>>NR-CGI | M | | 9.2.111 | NR cell for which served NR cell information is requested. (Identities of NR cells are requested) |
| >> >ECGI or (PCI + Frequency) | | | | |
| >Full List | | | | |
| >>Complete Information Request Indicator | M | | ENUMERATED (allServed NRCells, . . . ) | Included when the eNB requests the complete list of served NR cells. |

From the above content, it can be known that by receiving the association information between the first cell and the second cell transmitted by the first base station (i.e., eNB), the second base station (i.e., the gNB) can learn about the correspondence between the cells of the eNB and the cells requested by the eNB among the cells of the second base station. Specifically, the gNB receives the EN-DC configuration update message carrying the association information; or receives the NG RAN node configuration update message carrying the association information.

Figure 2:
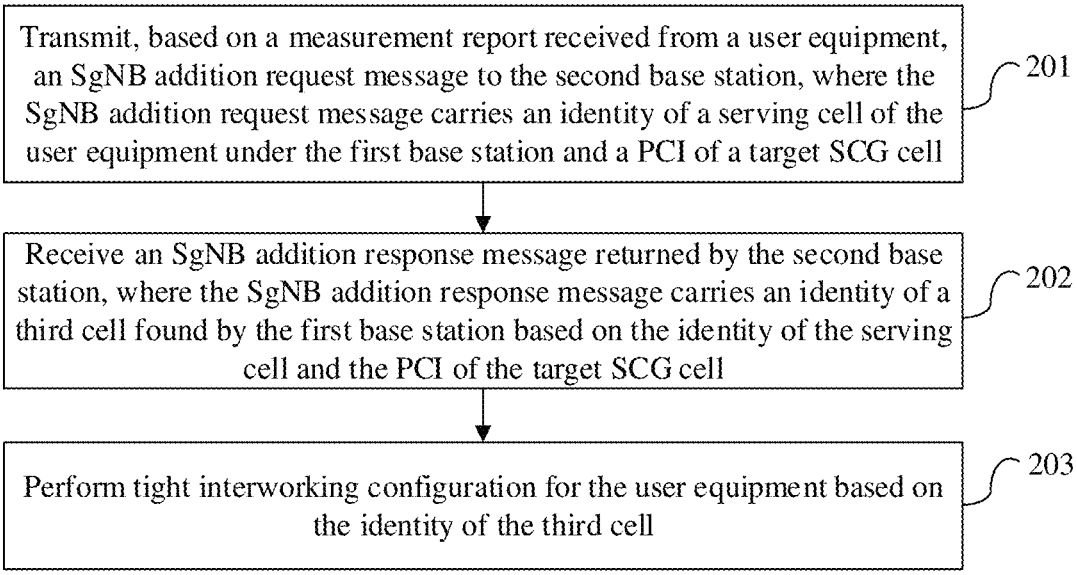
FIG. 2 is a second flow chart of steps of a method for tight interworking processing according to embodiments of the disclosure.

After that, in a case that the UE under the eNB initiates measurement reporting, as shown in FIG. 2, the method according to embodiments of the present disclosure further includes the following steps.

Step 201 includes: transmitting, based on a measurement report received from a user equipment, a secondary base station addition request (secondary gNB addition request, SgNB addition request) message to the second base station, where the SgNB addition request message carries an identity of a serving cell of the user equipment under the first base station and a physical layer cell identity (PCI) of a target secondary cell group (SCG) cell.

Step 202 includes: receiving a secondary base station addition response (secondary gNB addition response, SgNB addition response) message returned by the second base station, where the SgNB addition response message carries an identity of a third cell found by the first base station based on the identity of the serving cell and the PCI of the target SCG cell.

Step 203 includes: performing tight interworking configuration for the user equipment based on the identity of the third cell.

In this way, in a case that the eNB decides to add an SCG cell for the UE based on the received measurement report of the UE, the eNB transmits an SgNB addition request message to the gNB, where the gNB addition request message carries an identity of a serving cell of the UE under the eNB and a PCI of a target SCG cell, so that the gNB may accurately find an identity of a third cell corresponding to the serving cell based on the identity of the serving cell, the PCI of the target SCG cell, and the previously known association information between the first cell and the second cell. The third cell is the target SCG cell. The eNB receives an SgNB addition response message carrying the identity of the third cell transmitted by the gNB, and performs tight interworking configuration for the UE based on the identity of the third cell, which improves the accuracy of determining the target SCG cell for the UE.

The association information between the first cell and the second cell includes an identity of the first cell, and the identity of the first cell includes:

an evolved universal mobile telecommunications system terrestrial radio access network cell global identifier (ECGI); or, a PCI and a frequency.

The first cell belongs to the eNB, the first cell may be uniquely identified by the ECGI, or the first cell may be uniquely identified by both the PCI and the frequency. Therefore, the identity of the first cell in the association information between the first cell and the second cell is the ECGI; or, the PCI and the frequency.

However, the second cell belonging to the gNB needs to be uniquely identified using an NR-CGI. Therefore, the association information between the first cell and the second cell includes an identity of the second cell, and the identity of the second cell includes: a new radio cell global identifier (NR-CGI)

Application of the method according to the embodiments of the present disclosure in a tight interworking scenario is described in the following with reference to the accompanying drawings.

Figure 3:
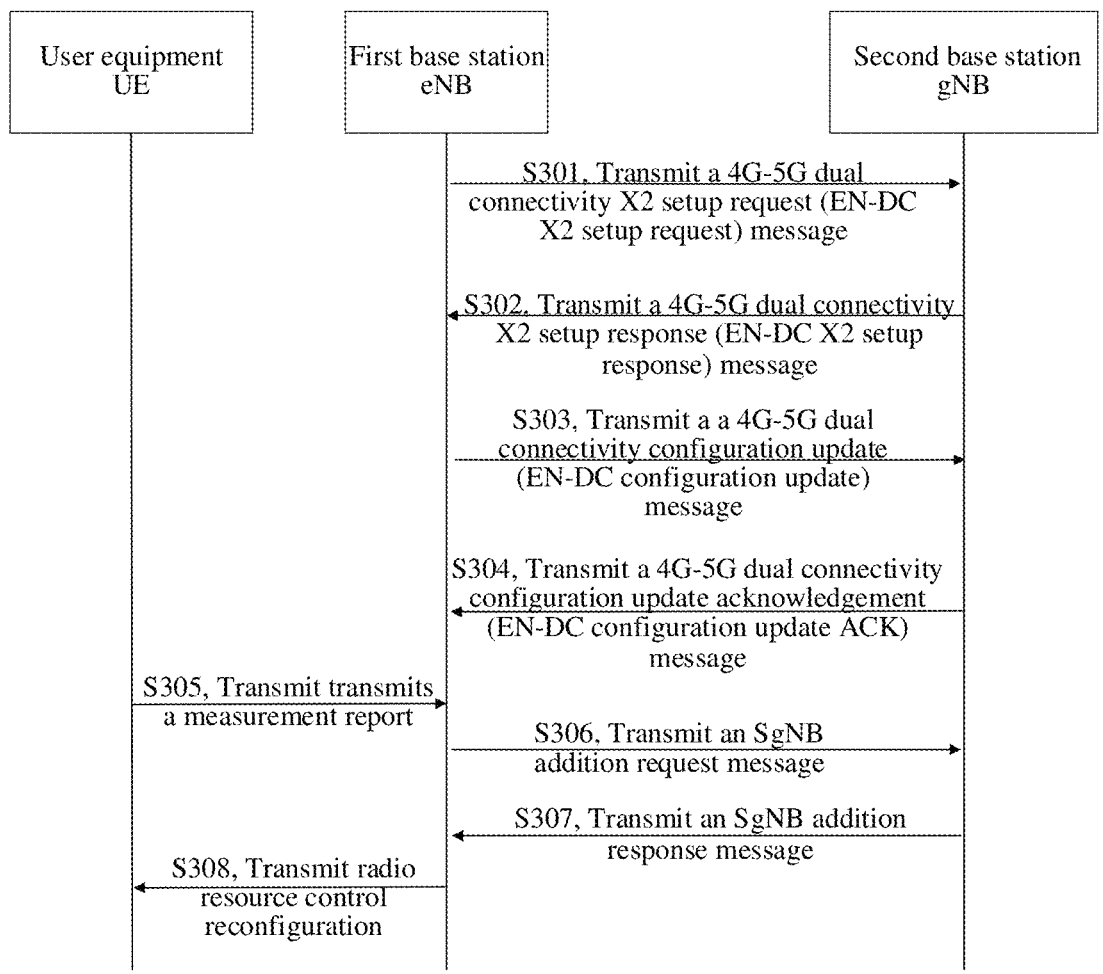
FIG. 3 is a first schematic diagram of an application of a method for tight interworking processing according to embodiments of the disclosure.

In a first scenario, an X2 interface connection needs to be established between the eNB and the gNB, as shown in FIG. 3.

In step S301, the eNB transmits a 4G-5G dual connectivity X2 setup request (EN-DC X2 setup request) message to the gNB.

In step S302, the gNB returns a 4G-5G dual connectivity X2 setup response (EN-DC X2 setup response) message.

In step S303, the eNB transmits an EN-DC configuration update message to the gNB. The message carries the association information between the first cell and the second cell. The first cell is a cell belonging to the eNB, and the second cell is a cell requested by the eNB and belonging to the gNB.

In step S304: the gNB saves the association information between the first cell and the second cell, and returns a 4G-5G dual connectivity configuration update acknowledgement (EN-DC configuration update ACK) message.

In step S305, the UE under the eNB transmits a measurement report.

In step S306, the eNB decides to add an SCG cell for the UE based on the measurement report reported by the UE, and transmits an SgNB addition request message to the gNB. The SgNB addition request message carries an identity (an ECGI or (a PCI and a frequency)) of a serving cell of the UE under the eNB and a PCI of a target SCG cell.

In step S307, the gNB finds an identity of the target SCG cell to be added, based on the identity of the serving cell of the UE under the eNB, the PCI of the target SCG cell, and the previously received association information between the first cell and the second cell, and transmits to the eNB an SgNB addition response message carrying the identity of the target SCG cell.

In step S308, based on the identity of the target SCG cell notified by the gNB, the eNB perform tight interworking configuration for the UE through a radio resource control reconfiguration (RRC reconfiguration) message.

Figures 4, 5, 6:
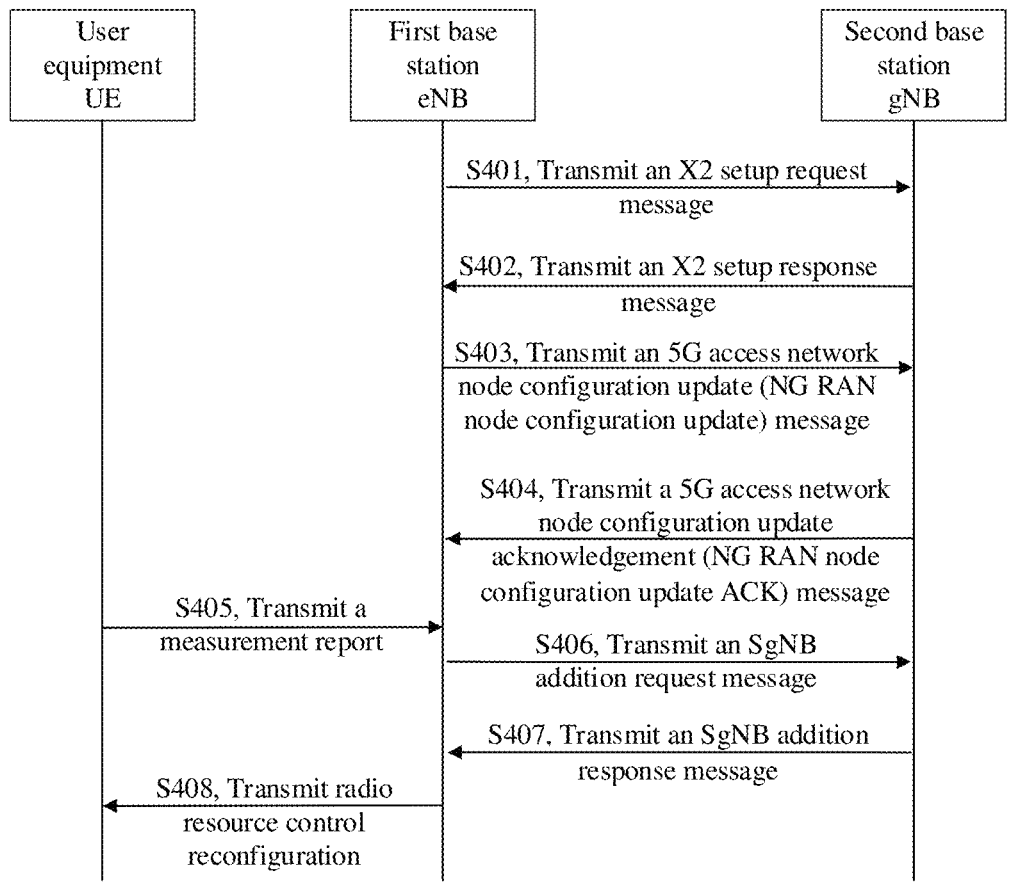
FIG. 4 is a second schematic diagram of an application of a method for tight interworking processing according to embodiments of the disclosure.
FIG. 5 is a flow chart of steps of a method for tight interworking processing according to another embodiment of the present disclosure
FIG. 6 is a schematic structural diagram of a device for tight interworking processing according to embodiments of the disclosure.

In a second scenario, an Xn interface connection needs to be established between the eNB and the gNB, as shown in FIG. 4.

In step S401, the eNB transmits an Xn setup request (X2 setup request) message to the gNB.

In step S402, the gNB returns an Xn setup response (X2 setup response) message.

In step S403, the eNB transmits an NG RAN node configuration update message to the gNB. The message carries the association information between the first cell and the second cell. The first cell is a cell belonging to the eNB, and the second cell is a cell requested by the eNB and belonging to the gNB.

In step S404, the gNB saves the association information between the first cell and the second cell, and returns a 5G access network node configuration update acknowledgement (NG RAN node configuration update ACK) message.

In step S405, the UE under the eNB transmits a measurement report.

In step S406, the eNB decides to add an SCG cell for the UE based on the measurement report reported by the UE, and transmits an SgNB addition request message to the gNB. The SgNB addition request message carries an identity (an ECGI or (a PCI and a frequency)) of a serving cell of the UE under the eNB and a PCI of a target SCG cell.

In step S407, the gNB finds an identity of the target SCG cell to be added, based on the identity of the serving cell of the UE under the eNB, the PCI of the target SCG cell, and the previously received association information between the first cell and the second cell, and transmits to the eNB an SgNB addition response message carrying the identity of the target SCG cell.

In step S408, based on the identity of the target SCG cell notified by the gNB, the eNB performs tight interworking configuration for the UE through an RRC reconfiguration message.

In conclusion, in the method for tight interworking processing applied to the eNB according to the embodiments of the present disclosure, after the X2/Xn interface is established between the eNB and the gNB in the tight interworking scenario, the eNB transmits the association information between the first cell and the second cell to the gNB, to notify the correspondence between the requested cell under the gNB and the cell under the eNB to the gNB, so that the target SCG cell can be determined more accurately for the UE in the subsequent, and the processing error rate is reduced.

As shown in FIG. 5, a method for tight interworking processing according to embodiments of the present disclosure, which is applied to a second base station, includes the following step.

S501 includes: receiving association information between a first cell and a second cell, where the association information is transmitted by a first base station.

The first cell is a cell belonging to the first base station, and the second cell is a cell requested by the first base station and belonging to the second base station.

In the embodiments, by receiving the association information between the first cell and the second cell transmitted by the first base station (i.e., eNB), the second base station (i.e., the gNB) can learn about the correspondence between the cells of the eNB and the cells requested by the eNB among the cells of the second base station, which improves the accuracy of determining the target SCG cell for the UE in the subsequent.

Optionally, the step of the receiving the association information between the first cell and the second cell transmitted by the first base station includes:
receiving an EN-DC configuration update message carrying the association information, or,
receiving an NG RAN node configuration update message carrying the association information.

Corresponding to the establishment of different interfaces between the eNB and the gNB, the EN-DC configuration update message carrying the association information between the first cell and the second cell transmitted by the eNB may be received; or the NG RAN node configuration update message carrying the association information between the first cell and the second cell transmitted by the eNB may be received.

It can be seen from the above embodiments that, the association information between the first cell and the second cell is: a correspondence between the first cell and the second cell requested by the first cell. Or, the association information between the first cell and the second cell is: a correspondence between the second cell and all first cells that request the second cell.

Optionally, the association information between the first cell and the second cell includes an identity of the first cell and an identity of the second cell.

Specifically, the identity of the first cell is: an ECGI; or, a PCI and a frequency. The identity of the second cell is: an NR-CGI. In this way, in the association information between the first cell and the second cell, the identity of the first cell and the identity of the second cell each are a unique identity of the cell, and the cell can be uniquely determined through the identity.

Then, in a case that the UE under the eNB initiates measurement reporting and the eNB decides to add an SCG cell for the UE based on the measurement report received from the UE, the eNB transmits an SgNB addition request message to the gNB, and the method further includes:

receiving an SgNB addition request message transmitted by the first base station, where the SgNB addition request message carries an identity of a serving cell of a user equipment under the first base station and a PCI of a target SCG cell;

querying based on the identity of the serving cell, the PCI of the target SCG cell, and the association information between the first cell and the second cell, to obtain an identity of a third cell corresponding to the serving cell; and transmitting, to the first base station, an SgNB addition response message carrying the identity of the third cell.

The gNB can accurately find the identity of the third cell corresponding to the serving cell based on the identity of the serving cell and the PCI of the target SCG cell in the received SgNB addition request message, and the previously known association information between the first cell and the second cell. The third cell is the target SCG cell. Then the gNB addition response message carries the identity of the third cell is transmitted to the eNB.

Based on the method for tight interworking processing applied to the gNB according to the embodiments of the present disclosure, cooperated with the above method for tight interworking processing applied to the eNB, after the X2/Xn interface is established between the eNB and the gNB in the tight interworking scenario, the association information between the first cell and the second cell transmitted by the eNB is received, and the correspondence between the requested cell under the gNB and the cell under the eNB is learnt, so that the target SCG cell can be determined more accurately for the UE in the subsequent, and the processing error rate is reduced.

It should be noted that the method for tight interworking processing is applied to the gNB, and cooperates with the above method for tight interworking processing applied to the eNB, to realize the determination of the target SCG cell, the implementations of the embodiments of the above method for tight interworking processing applied to the eNB are applicable to this method, and the same technical effects can be achieved.

As shown in FIG. 6, a device for tight interworking processing according to embodiments of the present disclosure, which is applied to a first base station, includes:

a transmitting module 610, configured to transmit, to a second base station, association information between a first cell and a second cell;

the first cell is a cell belonging to the first base station, and the second cell is a cell requested by the first base station and belonging to the second base station.

The transmitting module is further configured to:

transmit, to the second base station, a 4G-5G dual connectivity configuration update (EUTRA-NR dual connectivity configuration update, EN-DC configuration update) message carrying the association information; or, transmit, to the second base station, a 5G access network node configuration update (next generation radio access network node configuration update, NG RAN node configuration update) message carrying the association information.

The association information between the first cell and the second cell includes: a correspondence between the first cell and the second cell requested by the first cell.

The association information between the first cell and the second cell includes: a correspondence between the second cell and all first cells requesting the second cell.

The device for tight interworking processing further includes:

an addition request transmitting module, configured to transmit, based on a measurement report received from a user equipment, a secondary base station addition request (secondary gNB addition request, SgNB addition request) message to the second base station, where the SgNB addition request message carries an identity of a serving cell of the user equipment on the first base station side and a physical layer cell identity (PCI) of a target secondary cell group (SCG) cell;

an addition response receiving module, configured to receive a secondary base station addition response (secondary gNB addition response, SgNB addition response) message returned by the second base station, where the SgNB addition response message carries an identity of a third cell found by the first base station based on the identity of the serving cell and the PCI of the target SCG cell; and a processing module, configured to perform tight interworking configuration for the user equipment based on the identity of the third cell.

The association information between the first cell and the second cell includes an identity of the first cell, and the identity of the first cell includes:

an evolved universal mobile telecommunications system terrestrial radio access network cell global identifier (ECGI); or, a PCI and a frequency.

The association information between the first cell and the second cell includes an identity of the second cell, and the identity of the second cell includes: a new radio cell global identifier (NR-CGI).

According to the device for tight interworking processing applied to the eNB of the embodiments of the present disclosure, after the X2/Xn interface is established between the eNB and the gNB in the tight interworking scenario, the eNB transmits the association information between the first cell and the second cell to the gNB, to notify the correspondence between the requested cell under the gNB and the cell under the eNB to the gNB, so that the target SCG cell can be determined more accurately for the UE in the subsequent, and the processing error rate is reduced.

It should be noted that the device adopts the above method for tight interworking processing applied to the eNB, the implementations of the embodiments of the above method for tight interworking processing applied to the eNB are applicable to the device, and the same technical effects can be achieved.

Figure 7:
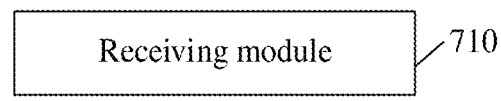
FIG. 7 is a schematic structural diagram of a device for tight interworking processing according to another embodiment of the present disclosure.

As shown in FIG. 7, a device for tight interworking processing according to embodiments of the present disclosure, which is applied to a second base station, includes:

a receiving module 710, configured to receive association information between a first cell and a second cell, where the association information is transmitted by a first base station;

the first cell is a cell belonging to the first base station, and the second cell is a cell requested by the first base station and belonging to the second base station.

The receiving module is further configured to:
receive an EN-DC configuration update message carrying the association information, or,
receive an NG RAN node configuration update message carrying the association information.

The association information between the first cell and the second cell includes an identity of the first cell and an identity of the second cell.

The device for tight interworking processing further includes:
a second receiving module, configured to receive an SgNB addition request message transmitted by the first base station, where the SgNB addition request message carries an identity of a serving cell of a user equipment under the first base station and a PCI of a target SCG cell;
a query module, configured to query based on the identity of the serving cell, the PCI of the target SCG cell, and the association information between the first cell and the second cell, to obtain an identity of a third cell corresponding to the serving cell; and
a query feedback module, configured to transmit, to the first base station, an SgNB addition response message carrying the identity of the third cell.

According to the device for tight interworking processing applied to the gNB of the embodiments of the present disclosure, after the X2/Xn interface is established between the eNB and the gNB in the tight interworking scenario, the association information between the first cell and the second cell transmitted by the eNB is received, and the correspondence between the requested cell under the gNB and the cell under the eNB is learnt, so that the target SCG cell can be determined more accurately for the UE in the subsequent, and the processing error rate is reduced.

It should be noted that the device for tight interworking processing adopts the above method for tight interworking processing applied to the gNB, the implementations of the embodiments of the above method for tight interworking processing applied to the gNB are applicable to the device, and the same technical effects can be achieved.

Figure 8:
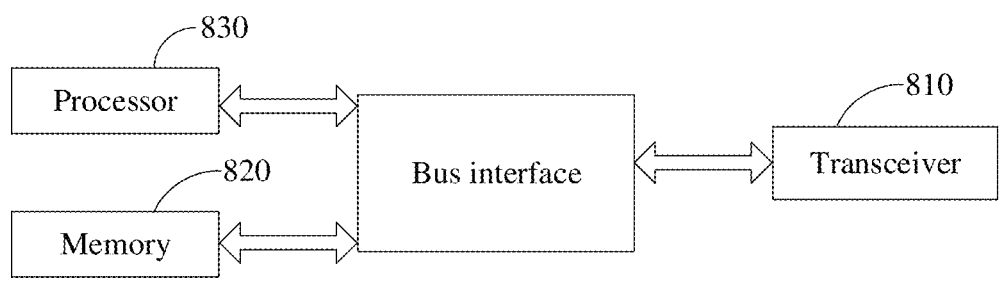
FIG. 8 is a schematic structural diagram of a base station according to embodiments of the disclosure.

FIG. 8 shows a base station according to embodiments of the present disclosure. The base station is a first base station and includes: a transceiver 810, a memory 820, a processor 830, and a computer program stored in the memory 820 and executable by the processor 830.

The transceiver 810 is configured to transmit, to a second base station, association information between a first cell and a second cell.

The first cell is a cell belonging to the first base station, and the second cell is a cell requested by the first base station and belonging to the second base station.

The transceiver 810 is further configured to:
transmit, to the second base station, an EN-DC configuration update message carrying the association information; or,
transmit, to the second base station, an NG RAN node configuration update message carrying the association information.

The association information between the first cell and the second cell includes: a correspondence between the first cell and the second cell requested by the first cell.

The association information between the first cell and the second cell includes: a correspondence between the second cell and all first cells requesting the second cell.

The transceiver 810 is further configured to: transmit, based on a measurement report received from a user equipment, an SgNB addition request message to the second base station, where the SgNB addition request message carries an identity of a serving cell of the user equipment on a side of the first base station and a physical layer cell identity (PCI) of a target secondary cell group (SCG) cell; and receive an SgNB addition response message returned by the second base station, where the SgNB addition response message carries an identity of a third cell found by the first base station based on the identity of the serving cell and the PCI of the target SCG cell.

The processor 830 is configured to perform tight interworking configuration for the user equipment based on the identity of the third cell.

The association information between the first cell and the second cell includes an identity of the first cell, and the identity of the first cell includes:
an evolved universal mobile telecommunications system terrestrial radio access network cell global identifier (ECGI); or,
a PCI and a frequency.

The association information between the first cell and the second cell includes an identity of the second cell, and the identity of the second cell includes: a new radio cell global identifier (NR-CGI).

In FIG. 8, a bus architecture may include any quantity of interconnected buses and bridges. Various circuits including one or more processors represented by the processor 830 and a memory represented by the memory 820 are coupled. The bus architecture may further couple various other circuits together, such as a periphery component, a voltage stabilizer and a power management circuit, which are known in the art and are not described herein. A bus interface provides an interface. The transceiver 810 may be multiple elements, i.e., including a transmitter and a receiver, providing a unit for communicating with various other devices on a transmission medium. The processor 830 is in charge of managing the bus architecture and common processes. The memory 820 may be configured to store data used by the processor 830 in performing operations.

Figure 9:
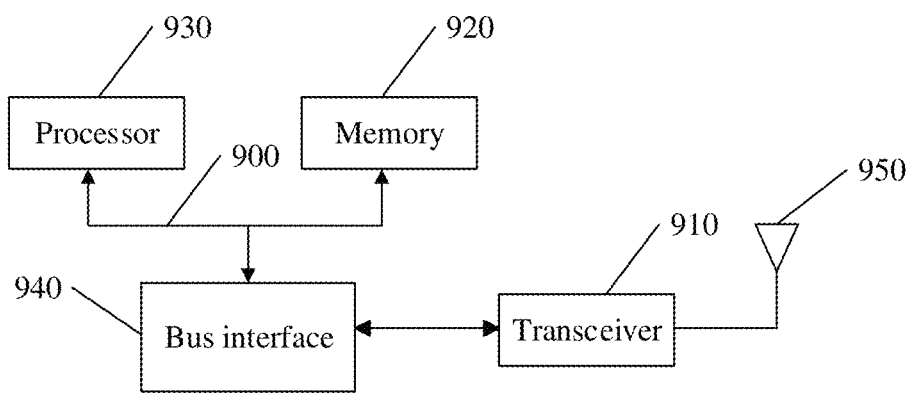
FIG. 9 is a schematic structural diagram of a base station according to another embodiment of the disclosure.

FIG. 9 shows a base station according to embodiments of the present disclosure. The base station is a second base station and includes: a transceiver 910, a memory 920, a processor 930, and a computer program stored in the memory 920 and executable by the processor 930.

The transceiver 910 is configured to receive association information between a first cell and a second cell, where the association information is transmitted by a first base station, the first cell is a cell belonging to the first base station, and the second cell is a cell requested by the first base station and belonging to the second base station.

The transceiver 910 is also configured to:
receive an EN-DC configuration update message carrying the association information, or,
receive an NG RAN node configuration update message carrying the association information.

The association information between the first cell and the second cell includes an identity of the first cell and an identity of the second cell.

The transceiver 910 is further configured to receive an SgNB addition request message transmitted by the first base station, where the SgNB addition request message carries an identity of a serving cell of a user equipment under the first base station and a PCI of a target SCG cell.

The processor 930 is configured to query based on the identity of the serving cell, the PCI of the target SCG cell, and the association information between the first cell and the second cell, to obtain an identity of a third cell corresponding to the serving cell.

The transceiver 910 is further configured to transmit, to the first base station, an SgNB addition response message carrying the identity of the third cell.

In FIG. 9, a bus architecture (represented by a bus 900) may include any quantity of interconnected buses and bridges. Various circuits including one or more processors represented by the processor 930 and a memory represented by the memory 920 are coupled via the bus 900. The bus 900 may further couple various other circuits together, such as a periphery component, a voltage stabilizer and a power management circuit, which are known in the art and are not described herein. A bus interface 940 provides an interface between the bus 900 and the transceiver 910. The transceiver 910 may be one element, or may be multiple elements, such as multiple receivers and multiple transmitters, providing a unit for communicating with various other devices on a transmission medium. The data processed by the processor 930 is transmitted on a radio medium through an antenna 950, and further, the antenna 950 receives data and transmits the data to the processor 930.

The processor 930 is in charge of managing the bus 900 and common processes, and may provide various functions, including timing, peripheral interface, voltage regulation, power management and other control functions. The memory 920 may be configured to store data used by the processor 830 in performing operations.

Optionally, the processor 930 may be a CPU, an ASIC, an FPGA or a CPLD.

Another embodiment of the present disclosure further provides a computer readable storage medium having a computer program thereon. The computer program, when being executed by a processor, performs the steps of the above method for tight interworking processing applied to the first base station.

Another embodiment of the present disclosure further provides a computer readable storage medium having a computer program stored thereon. The computer program, when being executed by a processor, performs the steps of the above method for tight interworking processing applied to the second base station.

The computer readable medium includes a permanent or non-permanent, removable or non-removable medium, and information storage may be realized by any method or technology. The information may be computer readable instructions, data structures, program modules, or other data. Examples of computer storage medium include, but are not limited to, a phase change random access memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, a CD read-only memory (CD-ROM), a digital versatile disc (DVD) or other optical storage, a magnetic cassette, a magnetic tape or magnetic disk storage or other magnetic storage devices, or any other non-transmission media, which may be used to store information that can be accessed by a computing device. According to the definition herein, the computer readable medium may not include a transitory computer readable medium, such as modulated data signals and carriers.

It should be further noted that the user equipment described herein includes, but is not limited to, a smart phone, a tablet computer, etc., and many of the described functional components are referred to as modules to more particularly emphasize independence of their implementations.

In the embodiments of the present disclosure, the modules may be implemented by software so as to be executed by various types of processors. For example, an identified executable code module may include one or more physical or logical blocks of computer instructions. For example, it may be constructed as an object, process, or function. Nevertheless, the executable codes of the identified module does not need to be physically located together, but may include different instructions stored in different locations. When these instructions are logically combined together, they constitute a module and implement the required purpose of the module.

In fact, the executable code module may be a single instruction or multiple instructions, and may even be distributed on multiple different code segments, distributed in different programs, and distributed across multiple memory devices. Similarly, operation data may be identified within the module, and may be implemented in any suitable form and organized in any suitable type of data structure. The operation data may be collected as a single data set, or may be distributed in different locations (including in different storage devices), and at least partly may only exist as electronic signals on the system or network.

In a case that the modules may be realized by software, taking into account the level of hardware technology in the related technologies, those skilled in the art may build corresponding hardware circuits to realize the corresponding functions for all the modules that can be realized by software when not considering the cost. The hardware circuits include conventional very large-scale integration (VLSI) circuits, or gate arrays, or semiconductors in related technologies such as logic chips or transistors, or other discrete components. The modules may also be implemented with programmable hardware devices, such as field programmable gate arrays, programmable array logics, programmable logic devices, etc.

The above exemplary embodiments are described with reference to the drawings. Many different forms and embodiments are feasible without departing from the spirit and teachings of the present disclosure. Therefore, the present disclosure should not be constructed as being limited by the exemplary embodiments presented herein. More precisely, these exemplary embodiments are provided to enable the present disclosure to be complete and thorough, and convey the scope of the present disclosure to those skilled in the art. In the drawings, component sizes and relative sizes may be exaggerated for clarity. The terms used herein are only for the purpose of describing specific exemplary embodiments, and are not intended to be limiting. As used herein, unless the context otherwise clearly indicates, the singular forms of "a", "an", and "the" are intended to include the plural forms as well. It can be further understood that these terms, "comprising" and/or "including", when used in the present disclosure, indicate existence of the described features, integers, steps, operations, structures and/or components, but do not exclude existence or addition of one or more of other features, integers, steps, operations, structures, components, and/or groups thereof. Unless otherwise indicated, a value range, when stated, includes the upper and lower limits of the range and any subranges therebetween.

Preferred implementations of the present disclosure are described in the above. It should be noted that for those of ordinary skill in the art, some improvements and modifications can be made without departing from the principle of the present disclosure, and these improvements and modifications fall within the protection scope of the present disclosure.

What is claimed is:

1. A method for tight interworking processing, applied to a first base station, comprising: transmitting, to a second base station, association information between first cells and second cells;
  wherein the first cells are cells belonging to the first base station, and the second cells are cells requested by the first base station and belonging to the second base station;
  wherein the association information between the first cells and the second cells comprises: a correspondence between each first cell of the first cells and the second cell requested by the each first cell; or, the association information between the first cells and the second cells comprises: a correspondence between each second cell of the second cells and all first cells requesting the each second cell.

2. The method for tight interworking processing according to claim 1, wherein the transmitting to the second base station the association information between the first cells and the second cells comprises:
  transmitting, to the second base station, an EUTRA-NR dual connectivity (EN-DC) configuration update message carrying the association information; or,
  transmitting, to the second base station, a next generation radio access network (NG RAN) node configuration update message carrying the association information.

3. The method for tight interworking processing according to claim 1, further comprising:
  transmitting, based on a measurement report received from a user equipment, a secondary gNB (SgNB) addition request message to the second base station, wherein the SgNB addition request message carries an identity of a serving cell of the user equipment under the first base station and a physical layer cell identity (PCI) of a target secondary cell group (SCG) cell;
  receiving an SgNB addition response message returned by the second base station, wherein the SgNB addition response message carries an identity of a third cell found by the second base station based on the identity of the serving cell and the PCI of the target SCG cell; and
  performing tight interworking configuration for the user equipment based on the identity of the third cell.

4. The method for tight interworking processing according to claim 1, wherein the association information between the first cells and the second cells comprises an identity of the each first cell, and the identity of the each first cell comprises: an evolved universal mobile telecommunications system terrestrial radio access network cell global identifier (ECGI); or, a PCI and a frequency.

5. The method for tight interworking processing according to claim 1, wherein the association information between the first cells and the second cells comprises an identity of the each second cell, and the identity of the each second cell comprises: a new radio cell global identifier (NR-CGI).

6. The method for tight interworking processing according to claim 1, wherein the first base station is an E-UTRAN Node B (eNB), and the second base station is a next generation Node B (gNB).

7. A method for tight interworking processing, applied to a second base station, comprising: receiving association information between first cells and second cells, wherein the association information is transmitted by a first base station;
  wherein the first cells are cells belonging to the first base station, and the second cells are cells requested by the first base station and belonging to the second base station;
  wherein the association information between the first cells and the second cells comprises: a correspondence between each first cell of the first cells and the second cell requested by the each first cell; or, the association information between the first cells and the second cells comprises: a correspondence between each second cell of the second cells and all first cells requesting the each second cell.

8. The method for tight interworking processing according to claim 7, wherein the receiving the association information between the first cells and the second cells, the association information being transmitted by the first base station, comprises: receiving an EN-DC configuration update message carrying the association information, or, receiving an NG RAN node configuration update message carrying the association information.

9. The method for tight interworking processing according to claim 7, wherein the association information between the first cells and the second cells comprises an identity of the each first cell and an identity of the each second cell.

10. The method for tight interworking processing according to claim 9, further comprising:
  receiving an SgNB addition request message transmitted by the first base station, wherein the SgNB addition request message carries an identity of a serving cell of a user equipment under the first base station and a PCI of a target SCG cell;
  querying based on the identity of the serving cell, the PCI of the target SCG cell, and the association information between the first cells and the second cells, to obtain an identity of a third cell corresponding to the serving cell; and
  transmitting, to the first base station, an SgNB addition response message carrying the identity of the third cell.

11. A base station, the base station being a second base station, and comprising: a transceiver, a memory, a processor, and a program stored in the memory and executable by the processor;
  wherein the transceiver is configured to perform the steps of the method for tight interworking processing according to claim 7.

12. The base station according to claim 11, wherein the transceiver is further configured to: receive an EN-DC configuration update message carrying the association information, or, receive an NG RAN node configuration update message carrying the association information.

13. The base station according to claim 11, wherein the association information between the first cells and the second cells comprises an identity of the each first cell and an identity of the each second cell.

14. The base station according to claim 13, wherein the transceiver is further configured to receive an SgNB addition request message transmitted by the first base station, wherein the SgNB addition request message carries an identity of a serving cell of a user equipment under the first base station and a PCI of a target SCG cell;
  wherein the processor is configured to query based on the identity of the serving cell, the PCI of the target SCG cell, and the association information between the first cells and the second cells, to obtain an identity of a third cell corresponding to the serving cell; and wherein the transceiver is further configured to transmit, to the first base station, an SgNB addition response message carrying the identity of the third cell.

15. The method for tight interworking processing according to claim 7, wherein the first base station is an E-UTRAN Node B (eNB), and the second base station is a next generation Node B (gNB).

16. A base station, the base station being a first base station, and comprising: a transceiver, a memory, a processor, and a program stored in the memory and executable by the processor;
wherein the transceiver is configured to transmit, to a second base station, association information between first cells and second cells, the first cells are cells belonging to the first base station, and the second cells are cells requested by the first base station and belonging to the second base station;
wherein the association information between the first cells and the second cells comprises: a correspondence between each first cell of the first cells and the second cell requested by the each first cell; or, the association information between the first cells and the second cells comprises: a correspondence between each second cell of the second cells and all first cells requesting the each second cell.

17. The base station according to claim 16, wherein the transceiver is further configured to:
transmit, to the second base station, an EN-DC configuration update message carrying the association information; or,
transmit, to the second base station, an NG RAN node configuration update message carrying the association information.

18. The base station according to claim 16, wherein the transceiver is further configured to:
transmit, based on a measurement report received from a user equipment, an SgNB addition request message to the second base station, wherein the SgNB addition request message carries an identity of a serving cell of the user equipment under the first base station and a physical layer cell identity (PCI) of a target secondary cell group (SCG) cell; and
receive an SgNB addition response message returned by the second base station, wherein the SgNB addition response message carries an identity of a third cell found by the second base station based on the identity of the serving cell and the PCI of the target SCG cell; and
wherein the processor is configured to perform tight interworking configuration for the user equipment based on the identity of the third cell.

19. The base station according to claim 16, wherein:
the association information between the first cells and the second cells comprises an identity of the each first cell, and the identity of the each first cell comprises: an evolved universal mobile telecommunications system terrestrial radio access network cell global identifier (ECGI); or, a PCI and a frequency; or,
the association information between the first cells and the second cells comprises an identity of the each second cell, and the identity of the each second cell comprises: a new radio cell global identifier (NR-CGI).

20. The base station according to claim 16, wherein the first base station is an E-UTRAN Node B (eNB), and the second base station is a next generation Node B (gNB).

* * * * *